Sept. 2, 1952 W. GAMBONEY 2,608,747

SAW VISE

Filed July 14, 1948

INVENTOR.
William Gamboney
BY Clarence E. Threedy
His Attorney.

Patented Sept. 2, 1952

2,608,747

UNITED STATES PATENT OFFICE 2,608,747

SAW VISE

William Gamboney, Chicago, Ill.

Application July 14, 1948, Serial No. 38,735

2 Claims. (Cl. 29—67)

This invention relates to a device for measuring the shaft of a radio volume control and for firmly holding the same during the removal of the excess length of the shaft.

Radio volume control units are sold with the shaft thereof of a length greater than the length required for installation of the volume control. This necessitates that the installer accurately measure the shaft and carefully remove the excess length of the shaft to reduce the shaft to the desired required length. As these volume controls are delicate structures, they will not withstand rough handling or tampering with the same. To remove the excess length of the shaft of the volume control requires careful operation upon the part of the installer so as not to damage the unit. It also requires of the operator that the shaft be accurately measured so that it will be of the proper length and that only so much of the shaft be removed as is not required.

It is therefore one of the objects of my invention to provide a holding device of the class described which will perform the three-fold functions of firmly holding the volume control during the removal operation of the excess shaft length; of providing an accurate and suitable guide for the saw employed to remove the excess shaft length; and of accurately measuring the shaft, by using the shaft of the old volume control, or the one to be replaced, as a template to determine the length of the shaft of the new volume control to be installed.

Other objects will appear hereinafter.

The invention consists in the novel combination and arrangement of parts to be hereinafter described and claimed.

The invention will be best understood by reference to the accompanying drawings showing the preferred form of construction, and in which.

Figures 1, 2, 3, 4:
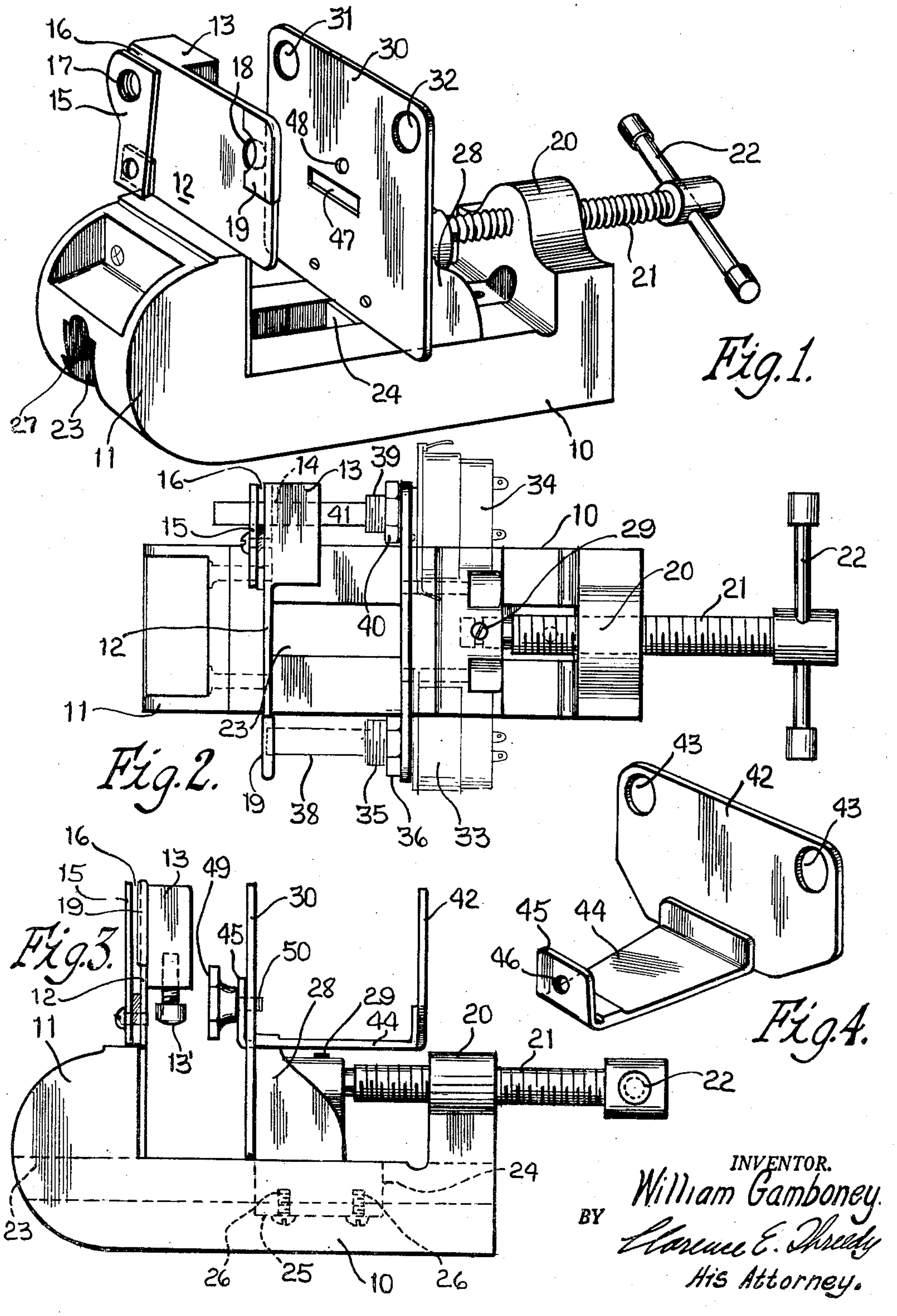
Fig. 1 is a perspective view of the holding device embodying my invention.
Fig. 2 is a top plan view of the same.
Fig. 3 is a side elevational view of the same illustrating an attachment associated therewith.
Fig. 4 is a perspective view of the attachment associated with the holding device shown in Fig. 3.

The several objects of my invention are best accomplished by the preferred form of construction shown in the accompanying drawings and in which 10 indicates a base plate of proper predetermined size and proportion. At one end of this base plate is provided a head 11 to which is attached, in any suitable manner, a vertically extending plate 12. This plate 12 adjacent one side edge thereof provides a substantially rectangularly shaped boss 13 having an opening 14 formed therein.

Secured to the plate 12 on the side thereof opposite the boss 13 is a guide plate 15 which provides together with the plate 12, a guide groove 16 for a suitable saw blade not shown. This plate 15 has formed therein an opening 17 disposed in alignment with the opening 14.

The plate 12 adjacent the opposite corner thereof has formed therein an opening 18. The plate 12 provides a wall 19 which extends against an adjacent side of the plate 12 and partially across the opening 18 for reasons which will be hereinafter more fully explained.

The opposite end of the base plate 10 provides a bearing 20. Threaded transversely of this bearing 20 is a screw shaft 21 manipulated by a handle 22 formed as an integral part thereof.

The base plate 10 provides a longitudinally extending slot 23. Slidably mounted in this slot 23 is a block 24. This block 24 is maintained in the slot 23 by a cross plate 25 secured to the block 24 by means of screws 26. The longitudinal edges of this cross plate 25 engage beneath undercuts 27 formed in the block 10. Mounted on this block 25 for movement therewith is a mounting head 28. This mounting head 28 has connection with the screw shaft 21 by a screw and groove connection 29.

Fixedly secured to this head 28 in any approved manner is a plate 30. This plate 30 adjacent opposite upper corners thereof has formed therein openings 31 and 32 disposed substantially in alignment with the openings 14 and 18, respectively.

My improved holding device thus far described is used in the following manner for holding, measuring and removing excess shaft length from a volume control:

In Fig. 2 of the drawing, the volume control to be replaced is shown in phantom at 33. The volume control to be substituted for the volume control 33 is likewise shown in Fig. 2 in phantom at 34. The volume control 33 includes a threaded sleeve 35 on which is threaded a mounting nut 36 by which the volume control is mounted upon a panel or other fixture. Projecting through this sleeve 35 is a shaft 38.

The volume control 34 likewise includes a threaded sleeve 39 on which is mounted a mounting nut 40. Extending through this sleeve 39 is a shaft 41. It is this shaft 41 which is to be measured so as to correspond to the precise length of the shaft 38. This is accomplished in the following manner:

The plates 12 and 30 are moved away from each other to space the plates a suitable distance apart to permit the convenient mounting of the volume control upon the plate 30. This is accomplished by mounting the volume control 33 upon the plate 30 by projecting the sleeve 35 through the opening 32 and then securing the volume control to the plate by means of the mounting nut 36.

The volume control 34 is mounted upon the plate in a like manner.

This will dispose the shaft 41 of the volume control 34 through the openings 14 and 17. By rotating the screw shaft 21, the plate 30 will be moved toward the plate 12. This movement is continued until the end of the shaft 38 projects through the opening 18 and abuts the wall 19. In this manner the line of saw upon the shaft 41 is accurately and positively determined. The saw blade is moved through the guide groove 16 during its operation upon the shaft for removing the excess shaft portion.

After this removal operation has taken place, the volume control 34 is removed from the holding device and is ready to be installed upon the panel or other mounting structure. During the removal of the excess shaft length, the shaft is firmly held in the opening of the boss by a set screw 13′.

In cases where the shaft of the volume control is of excessive length or of a length requiring a greater space between the plates 30 and 12 such as cannot be accomplished by operation of the screw shaft 21, I provide an auxiliary support for the volume controls. In this connection, this support or attachment, as it may properly be termed, is shown in Figs. 3 and 4. It comprises a plate 42 having provided in opposite upper portions openings 43 adapted to be disposed in alignment with the openings 31 and 32 in alignment with the openings 14 and 18.

Extending from this plate 42 is a tongue 44 having an angled end portion 45 perforated as at 46.

In the plate 30 is provided an elongated slot 47 and above this slot 47 is a thread-bearing opening 48.

The end portion 45 is projected through the slot 47 so as to flatly engage against the plate 30 as shown in Fig. 3. The attachment is then secured to the plate 30 through the medium of a thumb screw 49, the thread-bearing shaft 50 of which is threaded into the opening 48.

When this attachment is used, it is mounted in the manner shown in Fig. 3. The volume controls 33 and 34 are attached to the plate 42 in the same manner as they are attached to the plate 30. The shafts of the volume controls project through the openings 31 and 32 and through the openings 14, 17 and 18.

After this has been accomplished, the screw shaft 21 is rotated to abut the shaft of the volume control 33 against the stop wall 19 whereby to accurately determine the length of the shaft of the volume control 34 to be replaced.

By the use of my improved holding device, it is apparent that the excess shaft length can be easily and quickly removed without damage to the volume control unit.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A device of the class described comprising a mounting base, a relatively flat plate fixed to the base and extending upwardly therefrom, a second plate arranged in confronting relation with respect to the first-named plate, means for supporting said second plate in said confronting relation and for slidable movement upon said mounting base, said first-named plate being provided in opposite corresponding corners thereof with work receiving openings, means carried by said plate adjacent one of said openings for securing a work piece in said opening, a saw guide provided by said first-named plate transversely of one of said openings, a wall provided by said first-named plate and providing an obstruction in alignment with the other opening of said first-named plate, said complementary plate having formed in its opposite corresponding corner portions openings arranged in alignment with the openings of said first-named plate.

2. A device of the class described comprising a supporting base, a plate carried by the base and extending upwardly therefrom and having work receiving openings formed in opposite corresponding corner portions, means carried by said plate adjacent one of said openings for securing a work piece in said opening, a head slidably mounted on said supporting base, means for moving said head relative to said base, a plate carried by said head and extending upwardly therefrom in confronting relation with respect to said first-named plate and having work receiving openings formed in corresponding corner portions thereof in alignment with the openings of said first-named plate, a saw guide transversely of one of the openings of said first-named plate and a wall provided by said first-named plate and providing an obstruction to one side of said first-named plate in alignment with the other of said openings, said obstruction being in the same horizontal plane as the said saw guide.

WILLIAM GAMBONEY.

REFERENCES CITED

The following references are of record in the file of this patent:

UNITED STATES PATENTS

| Number | Name | Date |
|---|---|---|
| 1,630,993 | West | May 31, 1927 |
| 2,003,619 | Williamson | June 4, 1935 |
| 2,248,262 | Wilhide | July 8, 1941 |
| 2,363,230 | Condon et al. | Nov. 21, 1944 |